(No Model.) 2 Sheets—Sheet 1.

C. W. ROBERTSON.
HAY FORK.

No. 357,037. Patented Feb. 1, 1887.

Attest.
Sidney P. Hollingsworth.
Harry Shipley

Inventor.
C. W. Robertson
By his attorney
Philip T. Dodge

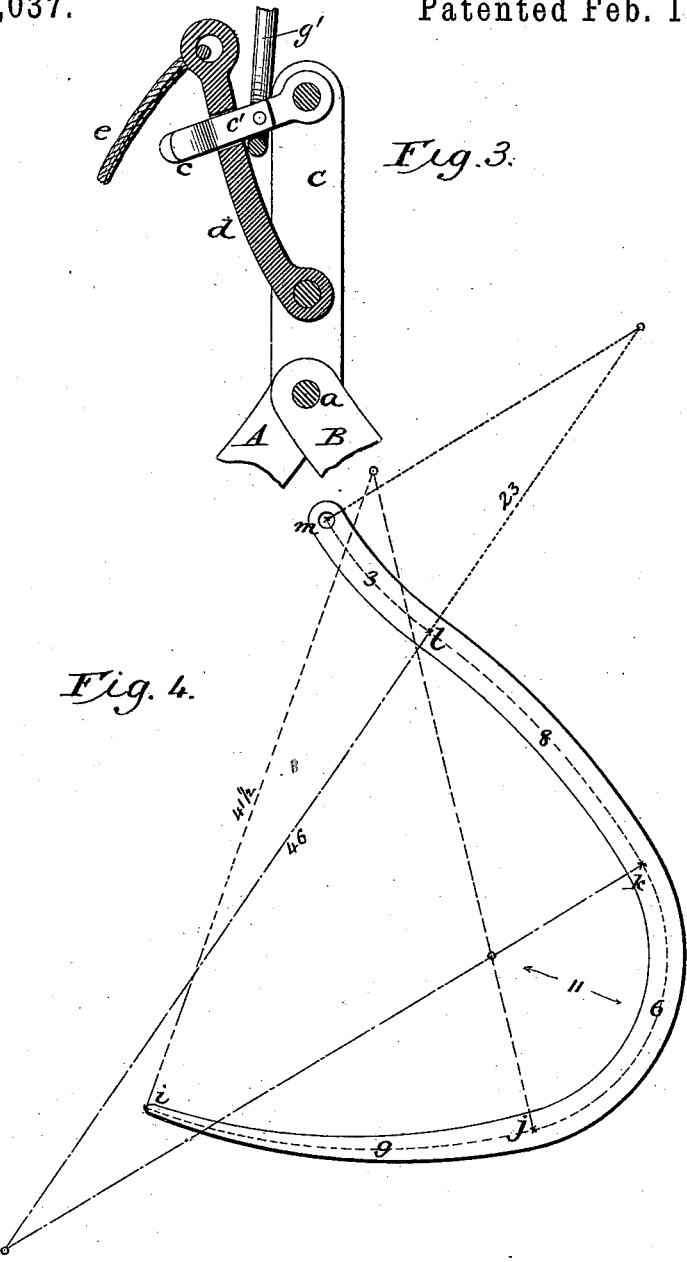

UNITED STATES PATENT OFFICE.

CHARLES W. ROBERTSON, OF FOND DU LAC, WISCONSIN.

HAY-FORK.

SPECIFICATION forming part of Letters Patent No. 357,037, dated February 1, 1887.

Application filed March 5, 1883. Serial No. 87,129. (No model.)

*To all whom it may concern:*

Be it known that I, CHARLES W. ROBERTSON, of Fond du Lac, in the county of Fond du Lac and State of Wisconsin, have invented certain Improvements in Hay-Forks, of which the following is a specification.

My invention relates to that class of grapples or forks which consist of two inwardly-curved arms or hooks jointed together at the upper end.

The aim of the invention is to cause the arms to enter and to release the hay more readily and quickly than those constructed in the usual manner.

To this end it consists in a peculiar form or curvature of the arms, and in locking and tripping devices connected in a peculiar manner.

Figure 1:
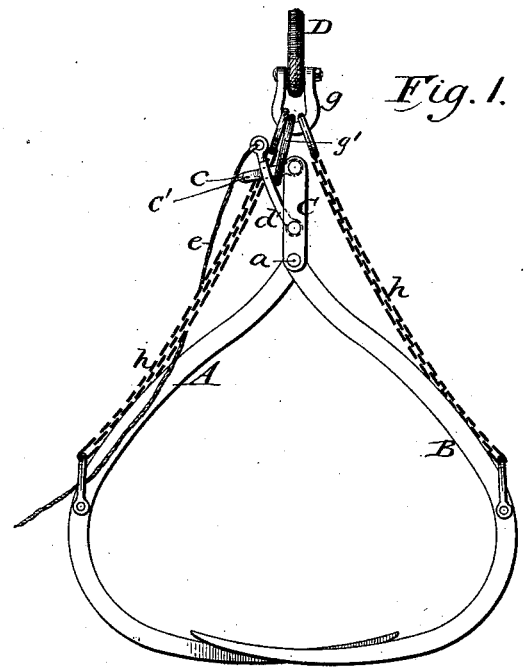
Figure 2:
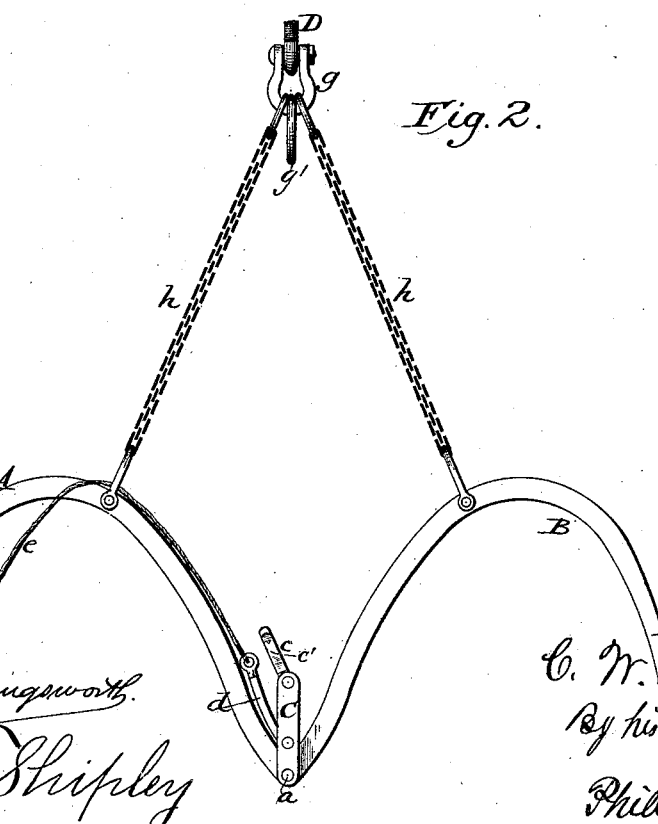

Referring to the accompanying drawings, Figure 1 represents a side view of my fork in an operative position; Fig. 2, a like view showing the same in its open position; Fig. 3, a vertical section through the locking and tripping devices; Fig. 4, a diagram illustrating more fully the peculiar curvature of the arms.

A and B represent the two arms or hooks connected at their upper ends by a transverse pivot-pin, $a$, and having their lower pointed ends bowed inward toward each other. The pivot-pin is mounted in the lower end of a link or clasp, C, having two side plates with an intermediate space containing a finger, $c$, and latch $d$. The latch $d$ is provided with a hole to receive the end of the finger $c$, over which it may be engaged to hold the same in a horizontal position, and is also provided with a cord, $e$, of any suitable length, by which it may be operated to release the finger.

D represents a rope by which the fork is suspended and carried, provided at the lower end with an eye or ring, $g$, to engage with two chains, $h$, extending to the respective arms midway of their length, or thereabout, and in this ring $g$ is hung a link or eye, $g'$, to engage the finger $c$.

In operating the device the arms or prongs are thrust into the hay and closed together, the eye $g'$ of the rope slipped upon the finger $c$, and the latter secured by engaging the latch thereon. When thus connected the strain of the rope causes the arms to be held in the closed position, the chains remaining slack. When it is required to discharge the hay, the line $e$ is pulled, thereby unlocking the latch $d$ from the finger $c$ and releasing the latter from the rope D, whereupon the weight of the hay causes the arms to open and release it, the arms swinging on the ends of the chains as fulcrums and assuming the position represented in Fig. 2.

The curvature of the arms and the manner of determining the same is clearly represented in Fig. 4. Each arm comprises four distinct arcs of circles, designated in Fig. 4 as $i\,j$, $j\,k$, $k\,l$, and $l\,m$, respectively. The arc $i\,j$, comprising the tines proper, has a radius of forty-one and one-half units and a length of nine units. The arc $j\,k$, embracing the main curve or bend, has a radius of eleven units and a length of six units. The arc $k\,l$, embracing the shank or body of the hook, has a radius of forty-six units and a length of eight units. The arc $l\,m$ has a radius of twenty-three units and a length of three units. The centers from which the arcs $k\,l$ and $l\,m$ are described and the point $l$ are in line, or substantially so.

In practice it is found that the arms constructed with substantially the curvatures above described will enter the hay and discharge the same easily and quickly, and that, unlike those constructed in the usual forms, they will remove the top of a load or mass without disturbing or scattering the remainder.

Owing to their peculiar form the arms may be placed upon or thrust slightly into the hay in an open position, and then connected with the draft-rope, which will act to cause the arms to close together into the hay as they are raised. As the points of the hooks are nearer to the pivot than the points $j$ of said hooks the tendency of the hay interposed between the points of the hooks would be to travel down the inclined curves toward the points $j$, and the upward draft of the rope will cause the points of the hooks to approach each other as the weight of the hay resists the lift of the rope D.

To avoid the danger of the latch $d$ being unlocked accidentally, I provide the finger $c$ on one side with a spring, $c'$, the inner end of which is secured rigidly to the side of the finger by suitable means and the central portion curved outward therefrom, the outer front end resting upon the side of the finger, as shown. This spring $c'$ being crowded through the eye in the latch $d$ as the latter passes over the finger, retains the parts in position, but admits of their being disengaged by a sharp pull on the trip-line.

It will be perceived on reference to the diagram that the curvature of the arms is such that they gradually approach the center, their inner ends or points being nearer the center or pivot than the outer ends. This is an important feature, in that it insures the automatic closing of the arms when the frame is lifted with the points in engagement with the mass of hay between them.

Having thus described my invention, what I claim is—

1. A hay-fork consisting, substantially as before set forth, of two curved arms or hooks pivoted together at one end and terminating at the other end in the arc $ij$, the distance between the pivot and the points $i$ being less than the distance between said pivot and the points $j$, whereby a lifting action exerted at the pivot will tend to close the arms and force a load held between the points of the hooks down the inclined curves toward points $j$.

2. In combination with the arms A and B, the link C, chain $p$, the lifting-rope provided with the eye or ring, the latch $d$, and the finger $c$, the latter being provided, as shown, with the friction-spring, whereby it is retained in engagement with the latch.

CHARLES W. ROBERTSON.

Witnesses:
E. A. GALLOWAY,
C. L. ALLING.